US00RE37823E

(19) United States
(12) Reissued Patent
Larson et al.

(10) Patent Number: US RE37,823 E
(45) Date of Reissued Patent: Sep. 3, 2002

(54) WATER SPORT TOWING APPARATUS AND METHOD

(75) Inventors: Borden M. Larson; William N. Snook, both of Orlando; Robert Todd, Winter Park, all of FL (US)

(73) Assignee: Correct Craft, Inc., Orlando, FL (US)

(21) Appl. No.: 09/613,154

(22) Filed: Jun. 30, 2000

Related U.S. Patent Documents

Reissue of:
(64) Patent No.: 5,979,350
Issued: Nov. 9, 1999
Appl. No.: 09/036,826
Filed: Mar. 9, 1998

U.S. Applications:

(63) Continuation-in-part of application No. 29/078,494, filed on Oct. 27, 1997, now Pat. No. Des. 409,972.

(51) Int. Cl.[7] ..... B63B 21/04; B63B 1/00; B63H 19/00

(52) U.S. Cl. ..... 114/253; 441/68; 440/33

(58) Field of Search ..... 114/253, 89, 66, 114/65 R, 83, 384, 361, 242, 254; 440/34; 441/68

(56) References Cited

U.S. PATENT DOCUMENTS

| | | | |
|---|---|---|---|
| 2,821,726 | A | 2/1958 | Correll |
| 3,034,470 | A | 5/1962 | Vanderfeltz et al. |
| D195,068 | S | 4/1963 | Griparis |
| 3,122,609 | A | 2/1964 | Moore |
| 3,336,894 | A | 8/1967 | Eisner |
| 3,503,358 | A | 3/1970 | Moesly |
| 3,724,595 | A | 4/1973 | Green |
| 3,802,374 | A | 4/1974 | Brown |
| 3,811,143 | A | 5/1974 | Page |
| 3,890,918 | A | 6/1975 | Sell |
| 3,925,836 | A | 12/1975 | Simmonds |
| 3,935,830 | A | 2/1976 | Cox |
| 3,949,698 | A | 4/1976 | Sell |
| 4,033,280 | A | 7/1977 | Wood et al. |

(List continued on next page.)

OTHER PUBLICATIONS

Alan Jones, A Star is Born, Boating World, Sep. 1997, pp. 33–34.

Seabrite Stainless Steel Marine Products, single page copy of brochure.

(List continued on next page.)

*Primary Examiner*—Stephen Avila
(74) *Attorney, Agent, or Firm*—Allen, Dyer, Doppelt, Milbrath & Gilchrist, P.A.

(57) ABSTRACT

The aerial performance characteristics of a performer using a water sport implement such as a wakeboard, and being towed by a vessel while maintaining stability of the vessel includes a first relatively rigid vertical support fitted to one side of the, a second relatively rigid vertical support fitted structure to an opposing side, and a horizontal bridging portion extending between upper extremities of the first and second vertically extending supports, at a height substantially above a level of the operator station for the vessel. A tow rope is attached to the horizontally extending bridging portion for towing the performer from the horizontally extending bridging portion while operating the vessel in a body of water. By pivotally attaching the first and second supports to the respective sides of the vessel, they can be rotated downwardly so that the vessel may pass underneath a bridge or into a boat house.

49 Claims, 6 Drawing Sheets

U.S. PATENT DOCUMENTS

| | | | |
|---|---|---|---|
| 4,163,529 | A | 8/1979 | Krenzer et al. |
| 4,341,177 | A | 7/1982 | Miyazaki et al. |
| 4,528,927 | A | 7/1985 | Iizuka et al. |
| 4,561,375 | A | 12/1985 | Paxton |
| 4,593,641 | A | 6/1986 | Adams et al. |
| 4,641,597 | A | 2/1987 | Paxton |
| 4,694,773 | A | 9/1987 | Sparkes et al. |
| 4,893,577 | A | 1/1990 | Jennings |
| 5,018,474 | A | 5/1991 | Jellen |
| 5,050,517 | A | 9/1991 | Kobayashi |
| 5,052,326 | A | 10/1991 | Wiggen et al. |
| 5,105,754 | A | 4/1992 | Collins |
| 5,215,025 | A | 6/1993 | Talmor |
| 5,520,133 | A | 5/1996 | Wiegert |
| 5,520,139 | A | 5/1996 | King et al. |
| 5,645,003 | A | 7/1997 | Grinde |
| 5,669,325 | A | 9/1997 | Feikema |
| 5,673,507 | A | 10/1997 | Stokes, Jr. |
| D395,866 | S | 7/1998 | Fowler et al. |
| 5,787,835 | A | 8/1998 | Remnant |
| 5,934,217 | A | 8/1999 | Allsop |
| 5,943,977 | A | 8/1999 | Womack et al. |
| 6,044,788 | A | 4/2000 | Larson et al. |

OTHER PUBLICATIONS

Photocopy of Police Resources Boat Photos.

"Hit It" Water Sports Video, © 1996 (No Identifiable Publication Date).

WATER SPORT TOWING APPARATUS AND METHOD

Matter enclosed in heavy brackets [ ] appears in the original patent but forms no part of this reissue specification; matter printed in italics indicates the additions made by reissue.

*CROSS-REFERENCE TO RELATED APPLICATION*

*This application is a Continuation-in-Part of application Ser. No. 29/078,494, filed Oct. 27, 1997 and issuing as U.S. Pat. No. Des. 409,972 on May 18, 1999, all of which are commonly owned and assigned.*

FIELD OF INVENTION

The present invention generally relates to towing of a performer by a vessel, and more particularly to enhancing performance of the performer using a water sport implement while maintaining stability of the vessel.

BACKGROUND OF THE INVENTION

Wakeboarding has become one of the fastest growing sports in the world. In the sport of wakeboarding, there is an ever increasing need for the tow boat to create a larger wake to ride. Unlike waterskiing, the performer on a wakeboard is looking for as large a wake as possible. Further, by anchoring the tow line at a high elevation above the boat deck, the greater the ability of the performer to lift higher into the air, whether with a ski or wakeboard.

Tow rope pylons are known in the art, such as those described in U.S. Pat. No. 4,893,577 to Jennings and U.S. Pat. No. 4,641,597 to Paxton. A typical skiing and wakeboarding pylon has a height of approximately three feet to eight above the floor of the boat. Pylon heights have increased to accommodate the ever increasing height of jumps across the wake by wakeboarders. The extended pylons run a cable from the top of the pylon to the bow of the boat as a guy wire. This wire interferes with movement inside the boat. Further, these extended height pylons have not satisfied wakeboarders with their performance. They do give the performer the ability to get bigger air on the jumps, but the extended pylons flex too much when the performer cuts away or to the wake. During these cuts, the boat heels to a point of instability for the boat and a hazard for all concerned. The guy wire provides support when the skier is pulling straight back, but offers less support when the skier is pulling from the side.

The simplest way to increase the size of the wake is to increase the amount of weight inside a boat. Typically, this has been done by adding lots of people. Alternatively, the industry's response has been to include water bladders in the boat or other weighting materials such as buckets filled with concrete, rocks, or sand.

In one bladder system, a liner is placed inside of a canvas sack or bag. Filling the liner full of water by use of a bilge pump with hoses, wires and clips, can add weight to the back of a boat. However, this process is awkward and cumbersome. Another attempt at adding weight to the back of a boat is believed to include two gates on a transom of a boat. A cable is pulled to open the two gates and thereby flood two tanks located behind the transom of the boat. The tanks are drained by opening the gates. This system required a four foot high boat hull, where typical sports towing boats have a transom or hull height of only thirty inches from bottom to top of the gunwale.

As described, by way of example with reference to U.S. Pat. No. 5,645,003 to Grinde, it is known to add water for ballasting, typically uniformly along the length of the boat or forward, as in U.S. Pat. No. 4,528,927 to lizuka et al. for enhancing the planing of the vessel. Typically ballast pumps are used to control the amount of water within the ballasting, as described, by way of example, with reference to U.S. Pat. No. 5,215,025 to Talmor.

It is typically thought that by simply adding more weight to the boat, the wake will become bigger and better. However, the shape of the wake is as important as the size. The perfect slope, length and hardness of the lip of a wake are also important to enable the performer to release from the wake and achieve a desired launch into the air. Further, it is important that wake control be done in a relatively rapid and timely manner, not available with use of a typical ballast pump.

SUMMARY OF THE INVENTION

In view of the foregoing background, it is therefore an object of the present invention to improve the aerial characteristics of a performance by a performer using a water sport implement, such as a wakeboard or ski, by way of example, and being towed by a vessel while maintaining the stability of the vessel.

This and other objects, features, and advantages of the invention, are provided by a method aspect of the invention comprising the steps of providing a vessel behind which the performer is to be towed, the vessel including a bow, a stern and an operator station between opposing sides, and fitting a first relatively rigid vertical support structure to a first one of the sides and fitting a second relatively rigid vertical support structure to a second one of the sides, and then extending a generally horizontal bridging portion between upper extremities of the first and second vertically extending support structures, at a height substantially above the level of the operator station. A tow rope is attached to the horizontally extending bridging portion, and the vessel is operated in a body of water while towing the performer from the horizontally extending bridging portion.

In an alternate method, the first and second generally vertically extending support structures are pivotally attached to the respective sides of the vessel, so as to permit the first and second support structures to be rotated downwardly so that the vessel may pass underneath a bridge or into a boat house.

An apparatus of the present invention comprises a vessel behind which the performer is to be towed, the vessel including a bow, a stern and an operator station between opposing sides, a first relatively rigid vertical support structure fitted to a first one of the sides of the vessel, a second relatively rigid vertical support fitted structure to a second one of the sides of the vessel, and a generally horizontal bridging portion extending between upper extremities of the first and second vertically extending support structures, at a height substantially above the level of the operator station. A tow rope is attached to the horizontally extending bridging portion for towing the performer from the horizontally extending bridging portion while operating the vessel in a body of water.

In an alternate embodiment, the apparatus further comprises pivotally attaching means for attaching the first and second generally vertically extending support structures to the respective sides of the vessel, so as to permit the first and second support structures to be rotated downwardly so that the vessel may pass underneath a bridge or into a boat house.

In yet another embodiment, each of the first and second vertical support structures comprise a forward vertical support element and an aft vertical support element, and wherein the apparatus further comprises a plurality of transversely extending bars between each of the forward and aft vertical support elements.

BRIEF DESCRIPTION OF DRAWINGS

A preferred embodiment of the invention as well as alternate embodiments are described by way of example with reference to the accompanying drawings in which.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited by the embodiments set forth herein. Rather, these embodiments are provided so that this disclosure will be thorough and complete, and will fully convey the scope of the invention to those skilled in the art. Like numbers refer to like elements throughout.

Figure 1:
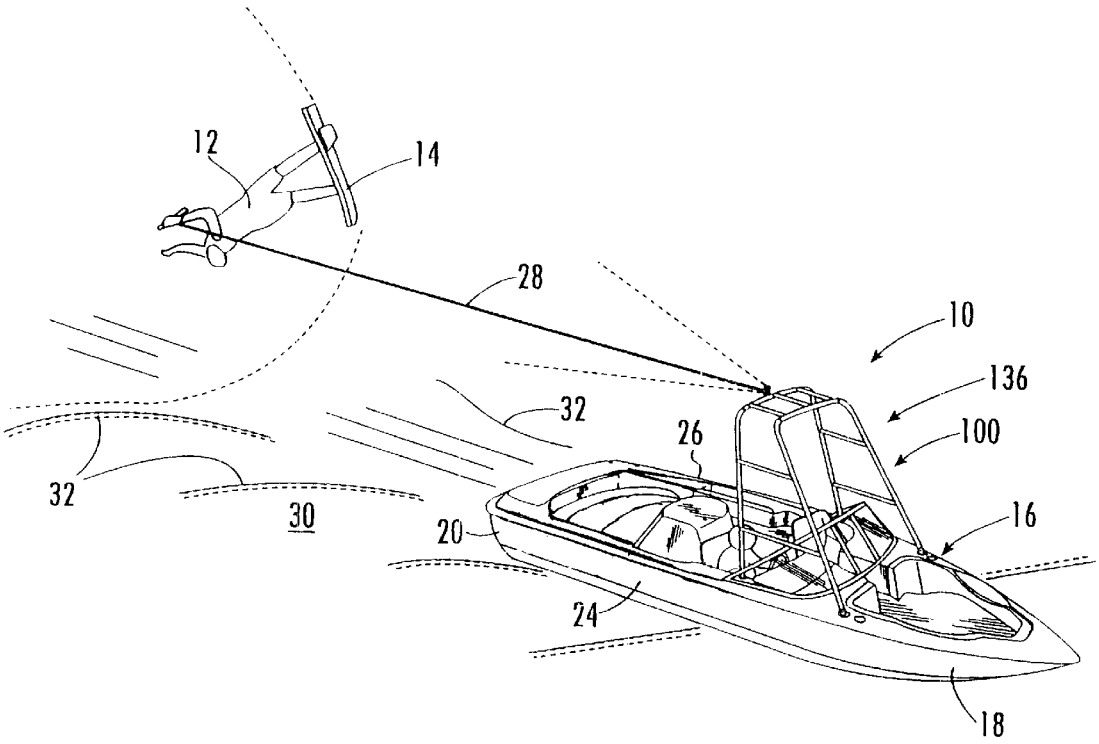
FIG. 1 is a perspective view of a vessel and performer in accordance with the present invention.
Figure 2:
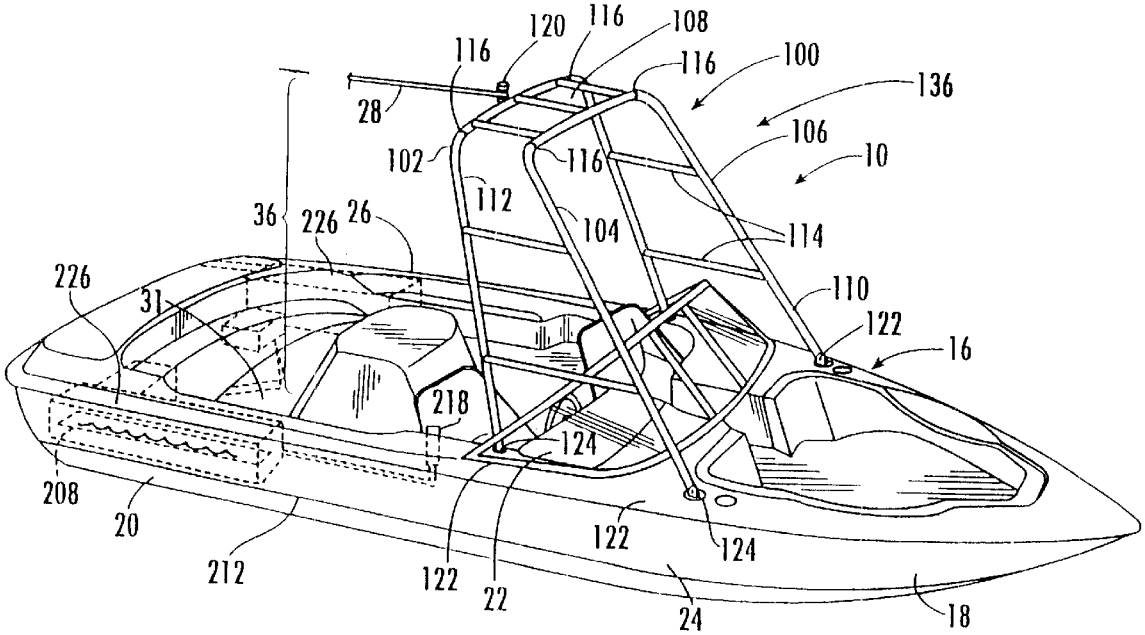
FIG. 2 is an enlarged perspective view of the vessel of FIG. 1 with rear ballast tanks illustrated.
Figure 3:
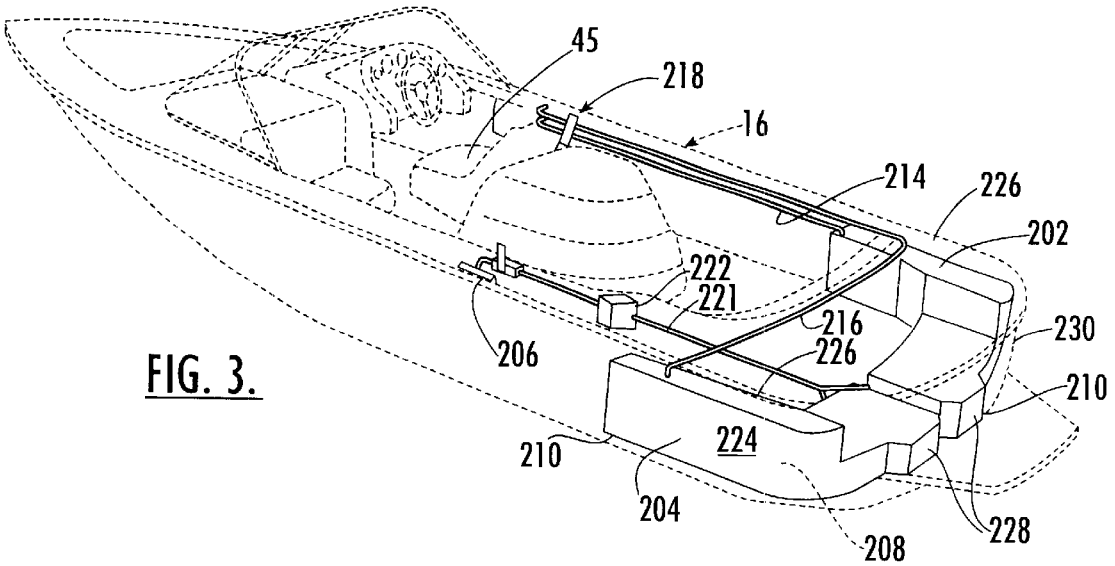
FIG. 3 is a partial perspective view of the ballast tanks carried within the vessel.

Referring now initially to FIGS. 1–3, a preferred embodiment of the present invention is herein described, by way of example, by a water sports system 10 for improving aerial characteristics of a performance by a performer 12 using a water sports implement such as a wakeboard 14. The system 10 comprises a vessel 16 behind which the performer 12 is to be towed. The vessel 16 includes a bow 18, a stern 20, and an operator station 22 between opposing starboard and port sides 24, 26. A towing structure referred herein as a vertical support unit 100 is fitted to the vessel 16. The vertical support unit 100, as will be further described later in this section, includes an upper portion 102 at a height above the level of the operator station 22 and is adapted for securing a tow rope 28 thereto. The tow rope 28 is attached to the upper portion 102 of the vertical support unit 100 for towing the performer 12, as illustrated again with reference to FIG. 1. The system 10 further includes a ballast assembly 200 which includes starboard and port ballast tanks 202, 204 fitted onboard and only aft, preferably within only the stern 20, extending from the transom toward amidships of the vessel 16, unlike typical ballast systems which fully extend bow to stern. Alternate embodiments include a single ballast tank. An extractor 206 is fitted to the hull of the vessel 16 and is in fluid communication with the body of water 30 within which the vessel operates for forcing water 208 into the ballast tanks 204, 202 and weighting down the aft portion of the vessel 16, thus lowering the vessel and controlling a wake 32 created by the vessel.

It is to be noted that various sized vessels will have varying length ballast tanks for extending the tank from the transom area to toward amidships to provide a desirable wake. Simply weighting down the vessel stern only proximate the transom leads to excess plowing of the vessel and an undesirable wake. Further, displacement boats having ballast from stern to bow, typically do not permit planing, desirable in a sports towing vessel. As a result, a certain amount of planing is to be maintained. By extending the ballast tank as herein described, an effective vessel performance and wake is achieved. Without deviating from the invention, alternate embodiments are now herein described.

With regard to the vertical support unit 100, reference being made again to FIG. 2, the vertical support unit comprises a first relatively rigid vertical support structure 104 fitted to the starboard side 24 of the vessel 16, a second relatively rigid vertical support structure 106 fitted to the port side 26, and a generally horizontal bridging portion 108 extending between upper extremities of the first and second vertically extending support structures at a desired height above the level of the operator station 22. In a preferred embodiment, the vertical support unit 100 forms a skeletal frame, as illustrated again with reference to FIG. 2, which has a forward relatively rigid U-shaped support structure 110 and an aft relatively rigid U-shaped support structure 112, both fitted across the beam of the vessel 16. Longitudinally extending rigid bars 114 are attached between the forward and aft U-shaped structures. In a preferred embodiment, the bars are generally horizontal and parallel to the floor 34 of the vessel 16, as illustrated with reference again to FIG. 2, by way of example. Such a frame transfers forces generated by towing the performer to the gunwales, by way of example, and provides a rigid anchoring of the tow rope to the vessel for improving over typical single tow bar devices referred to earlier in this specification. For convenience in shipping, the bridging portion 108 is separable from the vertical support structures 104, 106 at connections 116. In general, the preferred embodiment is made from generally rigid aluminum tubing with elements of the unit 100 welded to each other to form a generally rigid skeletal frame.

Figure 4:
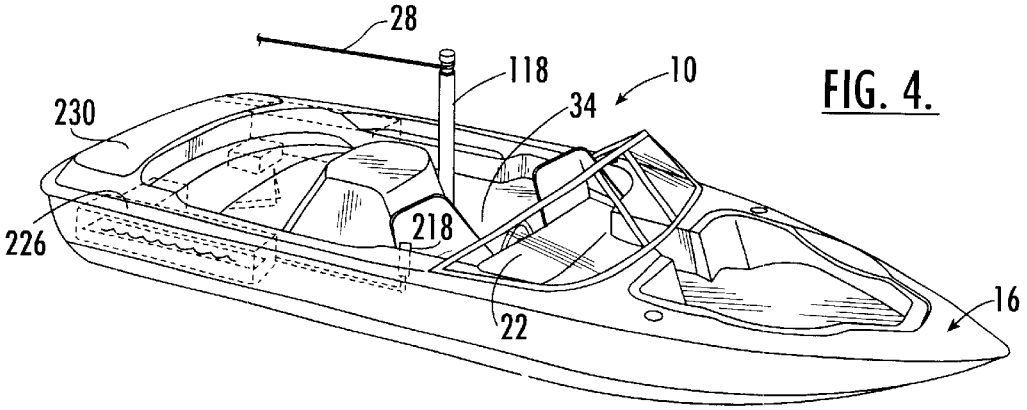
FIG. 4 is a perspective view of an alternate embodiment.
Figure 5:
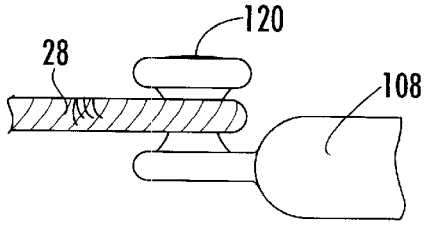
FIG. 5 is a partial side view of a towing element of the present invention.

In yet another embodiment, and with reference to FIG. 4, the vertical support unit 100 comprises a pylon 118 extending from the floor 34 of the vessel 16 and having an upper portion adapted for securing the tow rope 28 thereto. As illustrated again with reference to FIG. 2, and illustrated further with reference to FIG. 5, a tow rope connecting element 120 is attached to the upper portion of the vertical support unit 100, preferably to the horizontal bridging port 108 of the aft U-shaped support structure 112 for attaching the tow rope 28 thereto. The tow rope connecting element is mounted at a height 36 between 6' 3" and 7 feet above the floor 34 of the vessel 16, but it is expected that other heights will be selected by those skilled in the water sports arts. At this height 36, passengers on the vessel can comfortably walk under the U-shaped support structure 112 and the tow line 28 extending rearwardly from the boat for pulling the performer 12 while, at the same time, maintaining stability for the vessel 16 as the performer maneuvers around the vessel during the performance.

Figure 6:
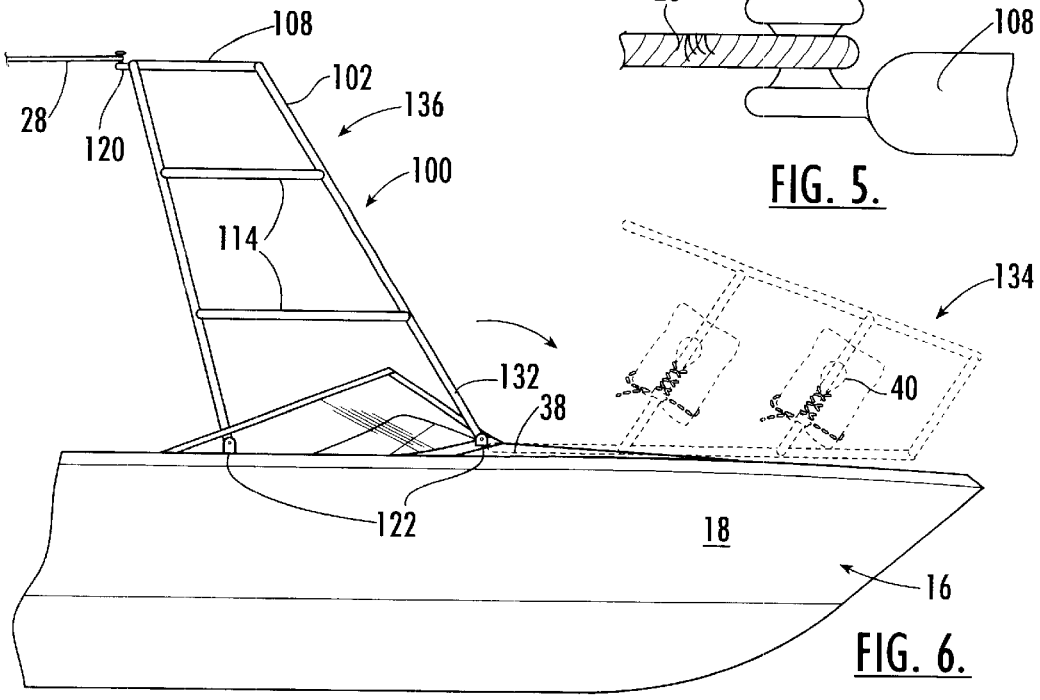
FIG. 6 is a partial side view of the embodiment of FIG. 2 illustrating an operating erected position and a rotated storing position of a towing structure of the present invention.
Figure 7:
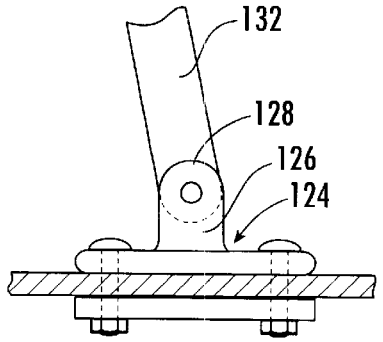
FIG. 7 is a partial side view of an attachment portion of the towing structure of FIG. 6.
Figure 8:
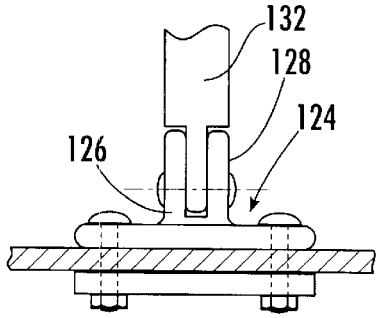
FIG. 8 is a partial front view of FIG. 7.
Figure 11:
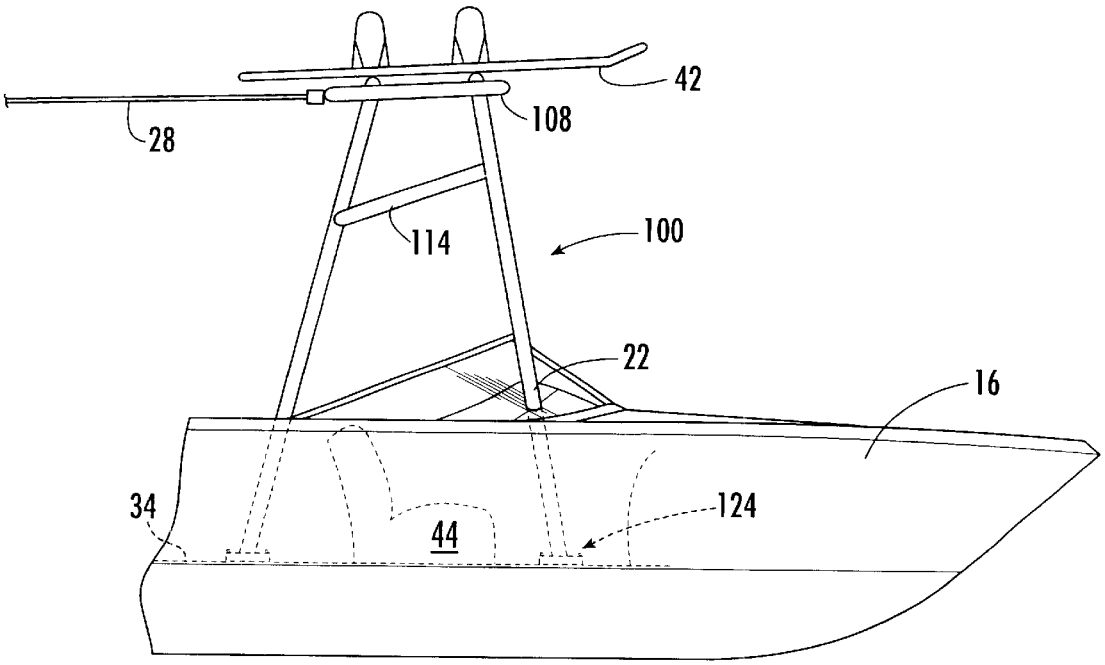
FIG. 11 is a partial side view of an alternate embodiment of FIG. 2.

The skeletal frame is an improvement over the pylon by providing a generally more rigid unit 100 secured to four mounting locations 122 at sides 24, 26 of the vessel 16. In a preferred embodiment of the invention, the vertical support unit 100, as illustrated with reference again to FIG. 2, and to FIGS. 6–8, the system 10 further comprises attaching the vertical support unit 100 to vessel deck portions and gunwales 38, so as to permit the unit to be rotated when the vessel needs to pass underneath a bridge or into a boat house, by way of example. In a preferred embodiment, anchoring plates 124 are located about the operator station 22. The anchoring plates 124 each include a shaft 126 which terminates in a free end 128 having a through hole for receipt of a pivot pin or bolt 130. Removably and rotatably mounted on the anchoring shafts 126 are lower extremities 132 of the skeletal frame, as illustrated with reference again to FIGS. 7 and 8. As illustrated with reference to FIG. 11, an alternate arrangement includes mounting the plates 124 to the floor 34 of the vessel 16.

Trailering of the vessel is made more convenient with this rotating feature. In the event the overall height of the unit 100 needs to be reduced for trailering, for example, the unit 100 is rotatable to a position 134 shown in dotted lines in FIG. 6 or is removable entirely from the vessel 16. As illustrated again with reference to FIGS. 7 and 8, the pin or bolt 130 is removed from the appropriate anchoring plates 124 for rotating the unit 100 onto the forward deck of the vessel or aft at the convenience of the operator.

Figure 9:
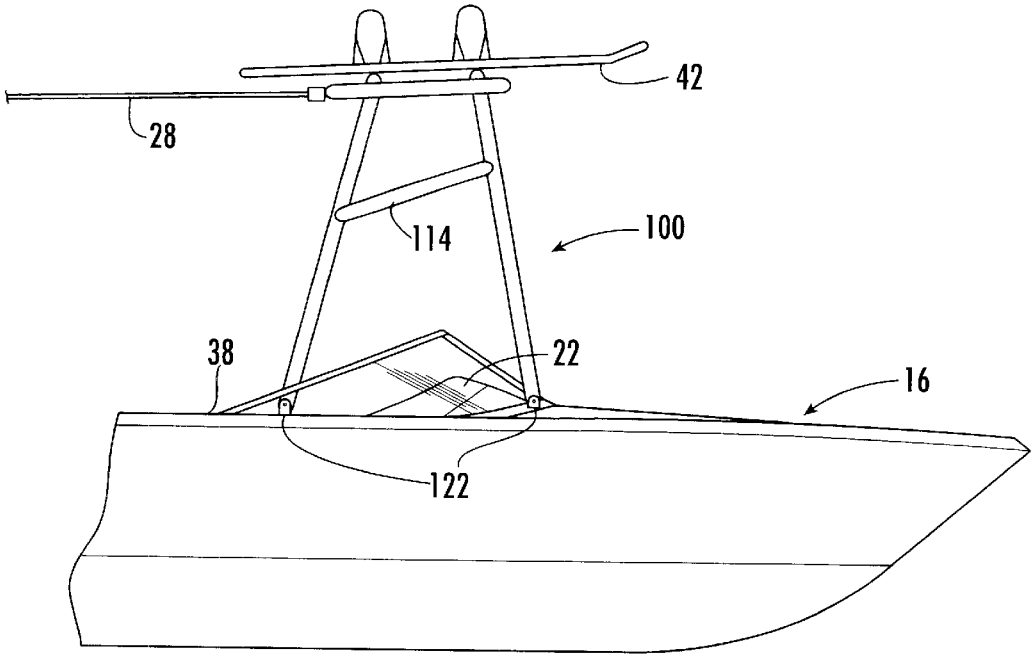
FIG. 9 is a partial side view of an alternate embodiment of FIG. 2.

In addition, it is convenient to use portions of the unit 100 to stow various pieces of equipment such as a life vest 40 or wakeboard 42 and other equipment as illustrated with reference again to FIG. 6 and FIG. 9. Further, the convenient mounting of stereo speakers is also accomplished. Such equipment is also conveniently stowed out of the way when unit 100 is in the erect position 136 as earlier described with reference to FIGS. 1 and 2.

Figure 10:
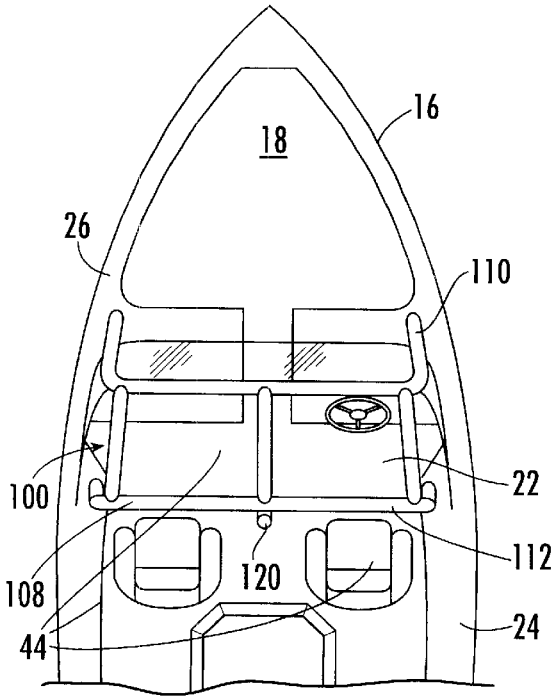
FIG. 10 is a partial top plan view of the embodiment of FIG. 2.
Figure 12:
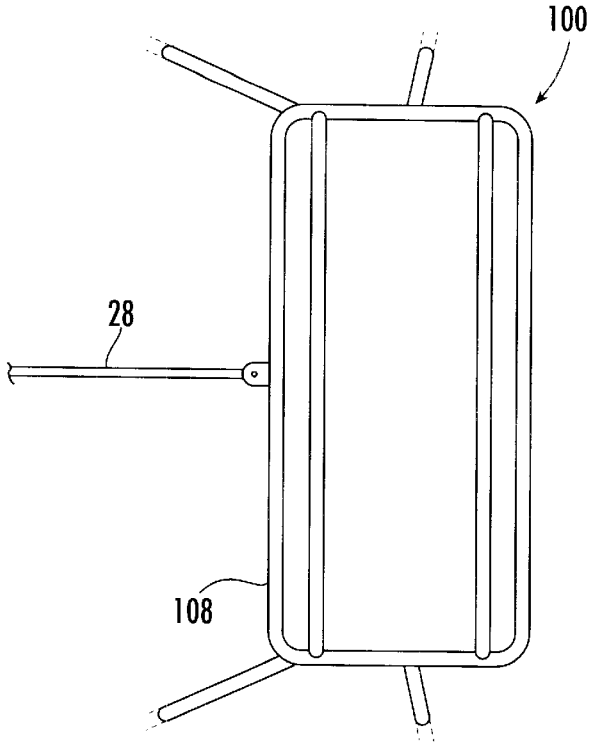
FIG. 12 is a partial top plan view of the embodiment of FIG. 11.
Figure 13:
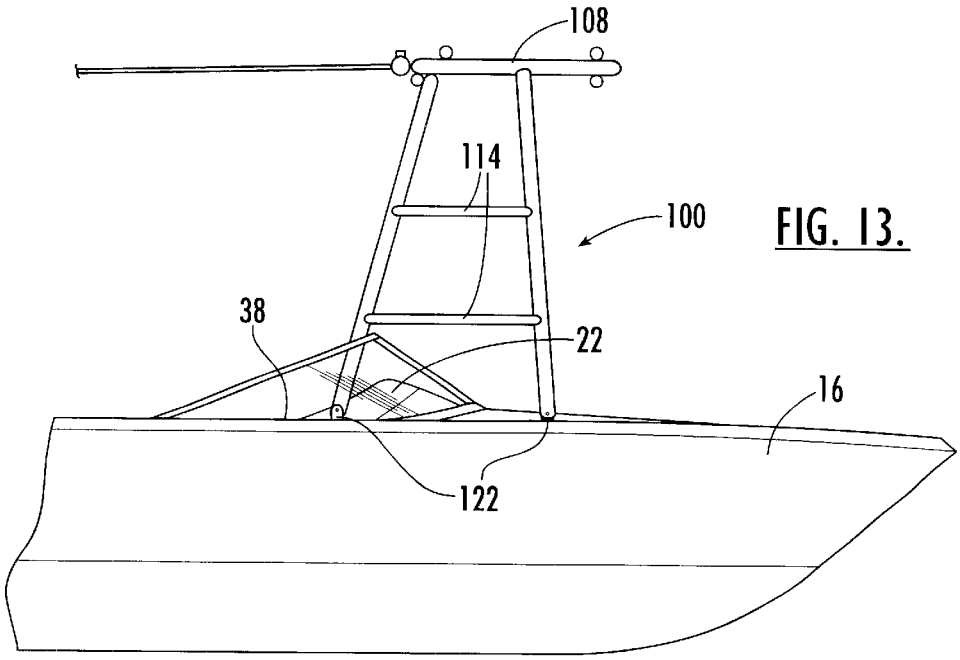
FIG. 13 is a partial side view of yet another embodiment of FIG. 2.

As illustrated with reference to FIG. 10, a clear line of sight is provided for individuals sitting in the seats 44 so as not to interfere with the steering of the vessel 16 or the maneuvering of passengers onboard. As illustrated, by way of example with reference to FIGS. 11–13, various embodiments for the unit 100 of the present invention are possible without deviating from the intent and value of the present invention.

Figure 14:
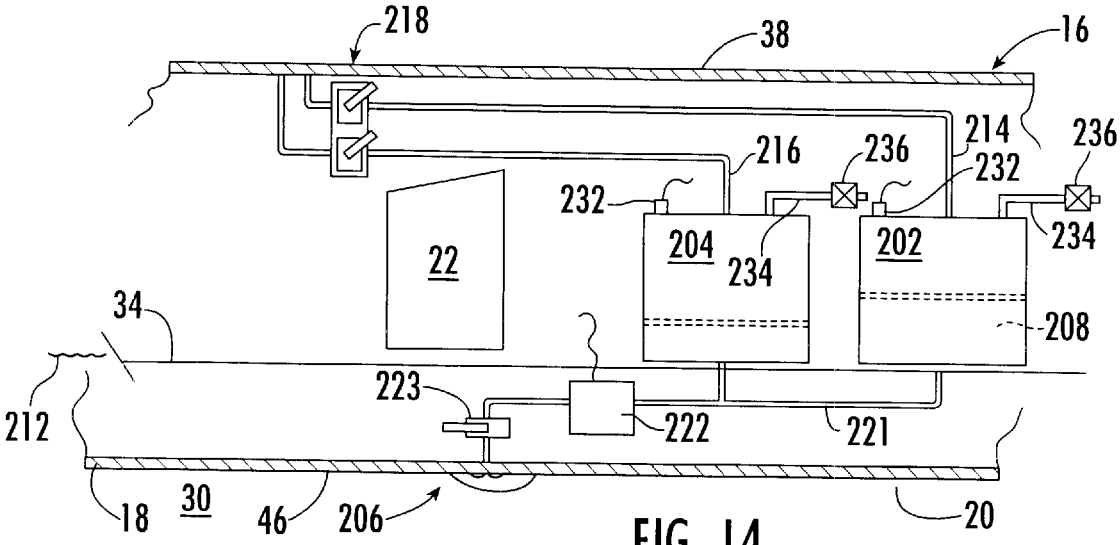
FIG. 14 is a schematic of a ballast tank control system of the present invention.

As illustrated with reference again to FIGS. 2–3, and to FIG. 14, a preferred embodiment of the system 10 and the ballast assembly 200, a lower most portion 210 of each of the ballast tanks 202, 204 is preferably fitted at the waterline 212 of the vessel 16 when the tanks are empty, typically the floor 34 for towing vessels as herein described.

In preferred embodiments of the ballast tanks 202, 204 and with reference again to FIGS. 3 and 14, the ballast tanks are enclosed and each have an opening arranged through vent lines 214, 216 for venting air into and out of each of the enclosed tanks 202, 204 respectively. Further, an air control valve 218 is within easy reach by the vessel operator for manually controlling air venting to each of the ballast tanks. It is anticipated that electrically, pneumatically or hydraulically operated control valves may be appropriate. The extractor 206, earlier described, includes a water scoop 220 positioned below the water line 212 and on the hull 46 of the vessel 16 for extracting the ballast water 208 from the body of water 30 as the vessel 16 moves through the body of water and delivering the ballast water 208 through a water intake line 221 connected between the scoop 220 and ballast tanks 202, 204. In an alternate embodiment, a two way pump 222 is placed within the line 221 and used for enhancing the extracting and dumping of the ballast water 208. Further, a shut off valve 223 is fitted within the line 221. As illustrated again with reference to FIGS. 2 and 3, the ballast tanks 204, 208 comprise starboard and port enclosed ballast tanks wherein each of the starboard and port enclosed ballast tanks comprises a generally L-shaped tanks having a first elongated leg 224 fitted beneath quarter gunwales 26 of the vessel 16 and a second leg 228 fitted along an inboard side of the transom 230.

As illustrated with reference again to FIG. 3, intermediate of the stern 20 and bow 18 is the operator's seat 45 within which the operator sits to control steering while viewing instruments. The air control valve 218 is within easy reach of the operator.

As illustrated again with reference to FIG. 14, the inlet line 221 leads to a water scoop 220 which collects the ballast water 208 as the vessel 16 is moved forward through the body of water 30. The water 208 collected in the scoop 220 is fed through the intake line 221 upon proper positioning of the valves 218, 223. If the shut off valve 223 is closed, no water 208 will be allowed to be fed into ballast tanks 202, 204. In addition, water 208, if already in ballast tanks 202, 204 will not be allowed to leave the tanks. However, if the water 208 is to be introduced into ballast tanks 202, 204, the shut off valve 223 must be opened and in addition, the respective air line control valve 218, independently controlling each of the air lines 214, 216 must be opened to allow air to escape from the ballast tanks as the water is being scooped up and fed into the tanks. Thus, if the air line control valve 218 is open, water 208 will be forced into ballast tanks 202, 204 as the boat is moving forward until the ballast tanks are full or the valves are closed. Excess water is forced through the air lines 214, 216 past the air line control valve 218 as one indication that the tanks are full. Alternatively, water level indicators 232 are used. Additionally, tank overflow tubes 234 fitted with one way check valves 236 deliver excess water overboard, as illustrated again with reference to FIG. 14. The overflow tubes 234 limit the maximum pressure in the tanks to a maximum static head. The check valves 236 stop air from flowing back in the tanks when the air control valve 218 is closed.

To remove the water 208 from the tanks 202, 204, the vessel comes to a stand still in a preferred method of dumping the ballast water. The shutoff valve 223 is then opened, with the opening of the air control valve 218 for allowing air into the air lines 214, 216. Through the forces of gravity, the water 208 flows out of the tanks 202, 204 through the intake line 221 and out through the opened shutoff valve 223 to the surrounding body of water 30.

Since the operator sitting in seat 45 has easy access to both valves 218, 223, the amount and shape of the wake 32, illustrated with reference again to FIG. 1, produced by the vessel 16 can be precisely controlled by the operator. By selectively shifting the ballast water 208 into and out of the tanks 202, 204, the wake 32 is produced to a controlled degree for optimum and desirable wakeboarding.

Accordingly, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A method for improving aerial characteristics of a performance by a performer using a water sport implement and being towed behind a vessel while maintaining the stability of the vessel, the method comprising the steps of:

providing a vessel behind which the performer is to be towed, the vessel including a bow, a foredeck aft of the bow, a stern, opposing sides extending from the bow to the stern, and an operator station positioned amidships between the sides;

fitting a first relatively rigid vertical support structure to a first one of the sides and fitting a second relatively rigid vertical support structure to a second one of the sides, and then extending a generally horizontal bridging portion between upper extremities of the first and second vertically extending support structures, amidships and at a height substantially above the operator station;

pivotally attaching the first and second vertically extending support structures to the respective sides of the vessel and positioning the first and second vertically extending support structures for rotating to a generally horizontal position;

attaching a tow rope to the horizontally extending bridging portion; and operating the vessel in a body of water while towing the performer from the horizontally extending bridging portion.

2. The method according to claim 1, wherein the fitting step comprises the steps of:

providing each of the first and second vertical support structures with a forward vertical support element and an aft vertical support element; and fixedly attaching a longitudinally extending bar between each of the forward and aft vertical support elements for forming a skeletal frame.

3. The method according to claim 2, wherein the longitudinally extending bar attaching step comprises the step of attaching the bar generally parallel to the floor of the vessel.

4. The method according to claim 2, further comprising the step of rearwardly angling each of the forward vertical support elements.

5. The method according to claim 1, wherein the first and second one of the sides correspond to starboard and port deck portions, respectively.

6. The method according to claim 1, wherein the first and second one of the sides correspond to starboard and port floor portions, respectively.

7. The method according to claim 1, wherein the height above the level of the operator station is at least six feet above the vessel floor.

8. The method according to claim 1, wherein the bridging portion comprises a tow rope connecting element for attaching the tow rope thereto, and wherein the attaching step comprises the step of attaching the tow rope to the tow rope connecting element.

9. The method according to claim 1, wherein the fitting step includes the step of providing forward and aft U-shaped support structures and forming a skeletal frame from a combination of the first and second vertical support structures and the horizontal bridging portion.

10. The method according to claim 1, wherein the support structures and bridging portion are formed from aluminum.

11. The method according to claim 1, further comprising the step of attaching a plurality of anchoring plates to the vessel, and wherein the fitting step includes the step of fitting each of lower extremities of the vertical support structures to one of the plurality of anchoring plates.

12. A method for towing a performer using a water sport implement and being towed behind a vessel while maintaining the stability of the vessel, the method comprising the steps of:

providing a vessel behind which the performer is to be towed, the vessel including a bow, a foredeck aft of the bow, a stern, opposing sides extending from the bow to the stern, and an operator station positioned amidships;

fitting a first relatively rigid U-shaped support structure across the beam of the vessel, amidships, and extending substantially above the level of the operator station;

rearwardly angling the first U-shaped structure;

fitting a second relatively rigid U-shaped support structure to the sides and across the beam of the vessel, amidships, and extending substantially above the level of the operator station, the first U-shaped support structure forward of the second U-shaped structure with the operator station located in an area between fittings of the first and second U-shaped structures at the respective sides;

attaching a plurality of longitudinally extending bars between the U-shaped support structures so that the first and second support structures form a skeletal frame extending above the operator station;

attaching a tow rope to an upper portion of the skeletal frame; and operating the vessel in a body of water while towing the performer.

13. The method according to claim 12, further comprising the step of pivotally attaching at least one of the U-shaped structures to the respective sides of the vessel, so as to permit the skeletal frame to be rotated downwardly onto a deck portion of the vessel.

14. The method according to claim 13, further comprising the step of downwardly rotating the skeletal frame onto the foredeck of the vessel.

15. The method according to claim 12, wherein the longitudinally extending bar attaching step comprises the step of attaching the bar generally parallel to the floor of the vessel.

16. The method according to claim 12, further comprising the step of attaching the U-shaped structures to starboard and port deck portions, respectively.

17. The method according to claim 12, further comprising the step of attaching the U-shaped structures to starboard and port floor portions, respectively.

18. The method according to claim 12, wherein the skeletal frame extends to a height above the level of the operator station that is at least six feet above the vessel floor.

19. The method according to claim 12, further comprising the step of attaching a tow rope connecting element to the upper portion of the skeletal frame for attaching the two rope thereto, and wherein the attaching step comprises the step of attaching the tow rope to the tow rope connecting element.

20. The method according to claim 12, wherein the tower is formed from aluminum.

21. The method according to claim 12, further comprising the step of attaching a plurality of anchoring plates to the vessel, and wherein the fitting step includes the step of fitting each of lower extremities of the U-shaped support structures to one of the plurality of anchoring plates.

22. A towing apparatus for improving aerial characteristics of a performance by a performer using a water sport implement, the towing apparatus comprising:

a vessel behind which the performer is to be towed, the vessel including a bow, a stern and an operator station positioned amidships between opposing sides;

a first relatively rigid vertical support structure fitted between the sides of the vessel at a point forward of the operator station;

a second relatively rigid vertical support structure fitted between the sides of the vessel aft of the first relatively rigid vertical support structure;

a generally horizontal bridging portion extending between upper portions of the first and second vertically extending support structures, at a height substantially above the level of the operator station; and a tow rope attached to the horizontally extending bridging portion for towing the performer from the horizontally extending bridging portion while operating the vessel in a body of water.

23. The apparatus according to claim 22, further comprising attaching means for attaching the first and second generally vertically extending support structures to the respective sides of the vessel, the attaching means operable so as to permit the first and second support structures to be rotated downwardly so that the vessel may pass underneath a bridge or into a boat house.

24. The apparatus according to claim 22, wherein each of the first and second vertical support structures comprise a forward vertical support element and an aft vertical support element, and wherein the apparatus further comprises a plurality of longitudinally extending bars fixedly attached between each of the forward and aft vertical support elements thus forming a skeletal frame.

25. The apparatus according to claim 24, wherein the plurality of longitudinally extending bars are generally parallel to the floor of the vessel.

26. The apparatus according to claim 24, wherein the forward vertical support element is rearwardly angled for having its lower extremity forward of its upper extremity.

27. The apparatus according to claim 22, wherein the first and second one of the sides correspond to starboard and port deck portions, respectively.

28. The apparatus according to claim 22, wherein the first and second one of the sides correspond to starboard and port floor portions, respectively.

29. The apparatus according to claim 22, wherein the height above the level of the operator station is at least six feet above the vessel floor.

30. The apparatus according to claim 22, further comprising a tow rope connecting element attached to the bridging portion for attaching the tow rope thereto.

31. The apparatus according to claim 22, wherein the skeletal frame is formed from aluminum.

32. The apparatus according to claim 22, further comprising a plurality of anchoring plates attached to the vessel, and wherein each of the lower extremities of the vertical supports are fitted to one of the plurality of anchoring plates.

33. A towing apparatus for a performer using a water sport implement and being towed behind a vessel while maintaining the stability of the vessel, the vessel having a bow, a stern, opposing sides extending from the bow to the stern, and an operator station located amidships between the opposing sides, the towing apparatus comprising:

a first relatively rigid U-shaped support structure for fitting to the sides across the beam of the vessel at a point forward of the operator station and positioned amidships substantially above the level of the operator station;

a second relatively rigid U-shaped support structure for fitting to the sides across the beam of the vessel and positioned amidships substantially above the level of the operator station;

a plurality of bars extending between the U-shaped support structures so that the first and second U-shaped support structures in combination with the plurality of bars form a skeletal frame, and wherein the first U-shaped support structure is positioned forward of the second U-shaped support structure; and tow rope attaching means fitted to the upper portion of the skeletal frame for attaching a tow rope thereto.

34. The apparatus according to claim 33 further comprising attaching means for attaching the skeletal frame to the vessel, so as to permit the skeletal frame to be rotated downwardly onto a deck portion of the vessel.

35. The apparatus according to claim 33, wherein the longitudinally extending bars are generally parallel to the floor of the vessel.

36. The apparatus according to claim 33, wherein the tow rope attaching means comprises a tow rope connecting element fixedly attached to the upper extremity of the skeletal frame.

37. The apparatus according to claim 33, further comprising a plurality of anchoring plates for attaching the skeletal frame to the vessel, and wherein each of lower extremities of the U-shaped supports is attached to one of the plurality of anchoring plates.

38. A method for improving aerial characteristics of a performance by a performer using a water sport implement and being towed behind a vessel while maintaining the stability of the vessel, the method comprising the steps of:

providing a vessel behind which the performer is to be towed, the vessel including a bow, a foredeck aft the bow, a stern, opposing sides extending from the bow to the stern, and an operator station positioned amidships between the bow and stern, aft of the foredeck;

attaching a rigid vertical bridging support structure at attachment points on each side of the vessel adjacent and substantially abeam the operator station, with a generally horizontal bridging portion of the vertical bridging support structure positioned substantially directly above the operator station;

attaching a tow rope to the bridging portion;

imparting sufficient structural strength to the vessel sides, the vertical bridging support structure, the horizontal bridging portion, and the attachment points so as to maintain structural integrity while transferring those rearward forces generated towing the performer to the vessel sides; and operating the vessel in a body of water while towing the performer from the horizontal bridging portion.

39. The method for improving aerial characteristics of a performance by a performer using a water sport implement and being towed behind a vessel while maintaining the stability of the vessel, the method comprising the steps of:

providing a vessel behind which the performer is to be towed, the vessel including a bow, a stern and an operator station between opposing sides;

fitting a first relatively rigid vertical support structure to a first one of the sides substantially abeam the operator's station, and fitting a second relatively rigid vertical support structure to a second one of the sides substantially abeam the operator's station, and then extending an elevated, generally horizontal bridge portion between the first and second vertically extending support structures, at a height substantially above the operator station;

attaching a tow rope to the horizontally extending bridging portion; and operating the vessel in a body of water while towing the performer from the horizontally extending bridging portion.

40. The method according to claim 39, further comprising the step of pivotally attaching the first and second generally vertically extending support structures to the respective sides of the vessel, so as to permit the first and second vertical support structures to be rotated downwardly so that the vessel may pass underneath a bridge or into a boathouse.

41. A vessel and towing tower for permitting a towed performer to achieve improved aerial characteristics while transmitting rearward towing forces amidships to spaced sides of the vessel, comprising:

a vessel having a bow, a stern, opposing sides extending between the bow and the stern, a vessel operator station located amidships between the bow and the stern and a windshield forward of the operator station, a first portion of the windshield extending laterally across the vessel between the opposing sides;

a rigid towing tower including at least four spaced, generally vertically-extending legs, two of the legs comprising a forward leg pair, each leg of the forward leg pair removably attached to a corresponding side of the vessel at an attachment point forward of the laterally-extending first windshield portion, the other two legs comprising a rearward leg pair each of which is removably attached to a corresponding side of the vessel at an attachment point aft of the laterally-extending first windshield portion;

an overhead tow structure fitted with and supported by the forward and rearward leg pairs substantially above the operator station, the overhead tow structure including lateral and longitudinal members forming a rigid overhead frame;

a tow rope receiver fitted to an aft one of the lateral members of the overhead frame; and wherein the first and second leg pairs, the respective attachment points and the overhead tow structure are imparted with sufficient structural strength so as to maintain structural integrity while transferring rearward forces generated by towing the performer to the vessel's sides.

42. The vessel and towing tower according to claim 41, further comprising:

other windshield portions extending along the sides; and wherein each attachment point for the rearward leg pair is adjacent a corresponding one of the other windshield portions.

43. The vessel and towing tower according to claim 41, further comprising:

each side of the vessel having a generally horizontal deck portion forward of the laterally-extending windshield portion; and wherein each attachment point of the forward leg pair is positioned on the horizontal deck portion of the corresponding side.

44. The vessel and towing tower according to claim 41, wherein each leg of the forward leg pair is angled upwardly and rearwardly toward the stern sufficiently to extend vertically over the operator station.

45. The vessel and towing tower according to claim 41, further comprising at least one support member extending between each leg of the forward leg pair rearwardly to a leg of the rearward leg pair which is attached to the same side of the vessel.

46. The vessel and towing tower according to claim 45, wherein the support member extends rearwardly in a plane generally parallel with the plane of the corresponding side.

47. The vessel and towing tower according to claim 46, further comprising plural rearwardly-extending support members between each leg of the forward leg pair and a corresponding leg of the second leg pair and lying in the plane generally parallel with the corresponding side.

48. The vessel and towing tower according to claim 41, wherein one leg pair and one of the lateral members of the overhead tow structure are formed together as a generally U-shaped support member.

49. The vessel and towing tower according to claim 48, wherein the first leg pair and a first one of the lateral members of the overhead tow structure together form a first generally U-shaped support structure, and wherein the rearward leg pair and a second one of the lateral members of the overhead tow structure together form a second generally U-shaped support structure.

* * * * *

UNITED STATES PATENT AND TRADEMARK OFFICE

CERTIFICATE OF CORRECTION

PATENT NO. : RE37,823 E
APPLICATION NO. : 09/613154
DATED : September 3, 2002
INVENTOR(S) : Borden M. Larson, William N. Snook and Robert Todd It is certified that error appears in the above-identified patent and that said Letters Patent is hereby corrected as shown below:

Under Reexamination Certificate for:

Patent No.: Please delete "1,037,823" and insert -- RE37,823 --

Signed and Sealed this
Eighteenth Day of October, 2011

David J. Kappos

David J. Kappos
*Director of the United States Patent and Trademark Office*

US00RE37823C1

(12) EX PARTE REEXAMINATION CERTIFICATE (8488th)

United States Patent

Larson et al.

(10) Number: US RE37,823 C1

(45) Certificate Issued: Aug. 30, 2011

(54) WATER SPORT TOWING APPARATUS AND METHOD

(75) Inventors: Borden M. Larson, Orlando, FL (US); William N. Snook, Orlando, FL (US); Robert Todd, Winter Park, FL (US)

(73) Assignee: Correct Craft IP Holdings, LLC, Orlando, FL (US)

Reexamination Request:
No. 90/010,858, Apr. 9, 2010

Reexamination Certificate for:

| | |
|---|---|
| Patent No.: | **1,037,823** |
| Issued: | **Sep. 3, 2002** |
| Appl. No.: | **09/613,154** |
| Filed: | **Jun. 30, 2000** |

Related U.S. Patent Documents

Reissue of:

| | |
|---|---|
| (64) Patent No.: | **5,979,350** |
| Issued: | **Nov. 9, 1999** |
| Appl. No.: | **09/036,826** |
| Filed: | **Mar. 9, 1998** |

Related U.S. Application Data

(63) Continuation-in-part of application No. 29/078,494, filed on Oct. 27, 1997, now Pat. No. Des. 409,972.

(51) Int. Cl.
*B63B 21/04* (2006.01)

(52) U.S. Cl. ..... 114/253; 441/68; 440/33

(58) Field of Classification Search ..... None
See application file for complete search history.

(56) References Cited

U.S. PATENT DOCUMENTS

| | | | |
|---|---|---|---|
| 3,352,275 | A | 11/1967 | Wilson |
| 3,724,595 | A | 4/1973 | Green |
| 5,417,178 | A | 5/1995 | Harrelson, II |
| D409,972 | S | 5/1999 | Todd |
| RE37,823 | E | 9/2002 | Larson |

OTHER PUBLICATIONS

"The Big Picture," *Wake Boarding*, Jun. 1994, pp. 30–31.
"1994 Sport Nautique," *Wake Boarding*, Fall 1993, pp. 10.
Taco Supply, *Marine Catalog*, 1987–88, pp. 34–35.

*Primary Examiner*—Beverly M. Flanagan

(57) ABSTRACT

The aerial performance characteristics of a performer using a water sport implement such as a wakeboard, and being towed by a vessel while maintaining stability of the vessel includes a first relatively rigid vertical support fitted to one side of the, a second relatively rigid vertical support fitted structure to an opposing side, and a horizontal bridging portion extending between upper extremities of the first and second vertically extending supports, at a height substantially above a level of the operator station for the vessel. A tow rope is attached to the horizontally extending bridging portion for towing the performer from the horizontally extending bridging portion while operating the vessel in a body of water. By pivotally attaching the first and second supports to the respective sides of the vessel, they can be rotated downwardly so that the vessel may pass underneath a bridge or into a boat house.

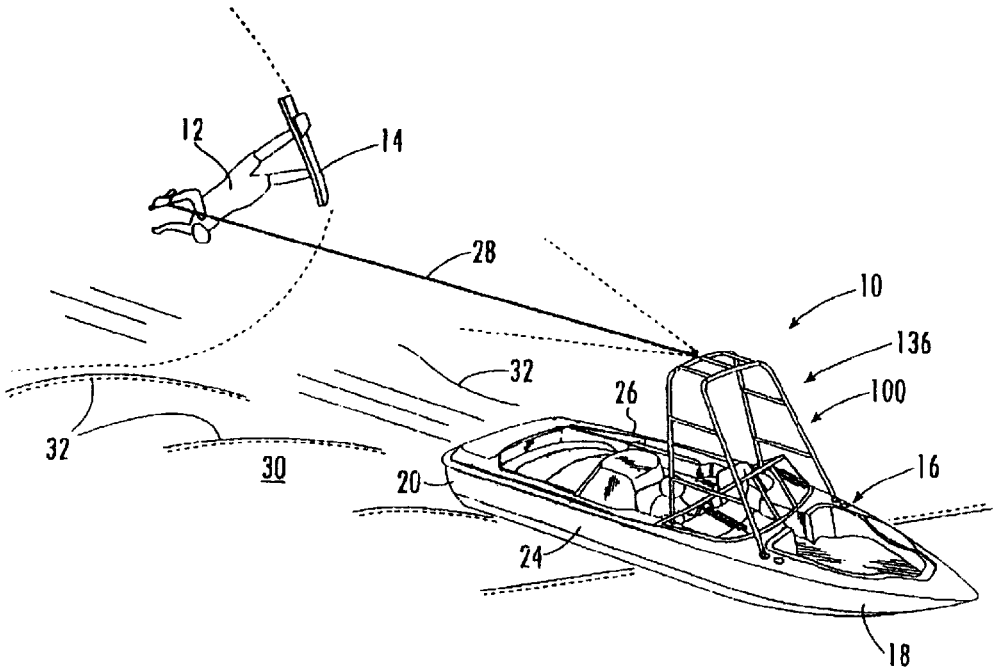

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the original patent but was deleted by the reissue patent; matter printed in italics was added by the reissue patent. Matter enclosed in heavy double brackets [[ ]] appeared in the reissue patent but is deleted by this reexamination certificate; matter printed in boldface is added by this reexamination certificate.

AS A RESULT OF REEXAMINATION, IT HAS BEEN DETERMINED THAT:

The patentability of claims 33-38 and 41-49 is confirmed.

Claims 1, 8, 12, 19, 22, 30 and 39 are determined to be patentable as amended.

Claims 2-7, 9-11, 13-18, 20, 21, 23-29, 31, 32, and 40, dependent on an amended claim, are determined to be patentable.

1. A method for improving aerial characteristics of a performance by a performer using a water sport implement and being towed behind a vessel while maintaining the stability of the vessel, the method comprising the steps of:

providing a vessel behind which the performer is to be towed, the vessel including a bow, a foredeck aft of the bow, a stern, opposing sides extending from the bow to the stern, and an operator station positioned amidships between the sides;

fitting a first relatively rigid vertical support structure to a first one of the sides and fitting a second relatively rigid vertical support structure to a second one of the sides, and then extending a generally horizontal bridging portion between upper extremities of the first and second vertically extending support structures, amidships and at a height substantially above the operator station;

pivotally attaching the first and second vertically extending support structures to the respective sides of the vessel and positioning the first and second vertically extending support structures for rotating to a generally horizontal position;

attaching a tow rope connector to the horizontal bridging portion, the tow rope connector comprising at least one of a tow rope connecting element for attaching a tow rope thereto and a receiver for receiving the tow rope connecting element;

attaching a tow rope to the [[horizontally extending bridging portion]] tow rope connector; and operating the vessel in a body of water while towing the performer from the horizontally extending bridging portion.

8. The method according to claim 1, wherein the bridging portion comprises [[a]] the tow rope connecting element [[for attaching the tow rope thereto]], and wherein the attaching step comprises the step of attaching the tow rope directly to the tow rope connecting element.

12. A method for towing a performer using a water sport implement and being towed behind a vessel while maintaining the stability of the vessel, the method comprising the steps of:

providing a vessel behind which the performer is to be towed, the vessel including a bow, a foredeck aft of the bow, a stern, opposing sides extending from the bow to the stern, and an operator station positioned amidships;

fitting a first relatively rigid U-shaped support structure across the beam of the vessel, amidships, and extending substantially above the level of the operator station;

rearwardly angling the first U-shaped structure; fitting a second relatively rigid U-shaped support structure to the sides and across the beam of the vessel, amidships, and extending substantially above the level of the operator station, the first U-shaped support structure forward of the second U-shaped structure with the operator station located in an area between fittings fo the first and second U-shaped structures at the respective sides;

attaching a plurality of longitudinally extending bars between the U-shaped support structures so that the first and second support structures form a skeletal frame extending above the operator station;

attaching a tow rope connector to an upper portion of the skeletal frame, the tow rope connector comprising at least one of a tow rope connecting element for attaching a tow rope thereto and a receiver for receiving the tow rope connecting element;

attaching a tow rope to [[an upper portion of the skeletal frame]] the tow rope connector; and operating the vessel in a body of water while towing the performer.

19. The method according to claim 12, [[further comprising the step of attaching a tow rope connecting element to the upper portion of the skeletal frame for attaching the two rope thereto, and]] wherein the tow rope attaching step comprises the step of attaching the tow rope to the tow rope connecting element.

22. A towing apparatus for improving aerial characteristics of a performance by a performer using a water sport implement, the towing apparatus comprising:

a vessel behind which the performer is to be towed, the vessel including a bow, a stern and an operator station positioned amidships between opposing sides;

a first relatively rigid vertical support structure fitted between the sides of the vessel at a point forward of the operator station;

a second relatively rigid vertical support structure fitted between the sides of the vessel aft of the first relatively rigid vertical support structure;

a genrally horizontal bridging portion extending between upper portions of the first and second vertically extending support structures, at a height substantially above the level of the operator station; [[and]]

a tow rope connector attached to the horizontal bridging portion, the tow rope connector comprising at least one of a tow rope connecting element for attaching a tow rope thereto and a receiver for receiving the tow rope connecting element;

a tow rope attached to the [[horizontally extending bridging portion]] tow rope connector for towing the performer from the horizontally extending bridging portion while operating the vessel in a body of water.

30. The apparatus according to claim 22, [[further comprising a]] wherein the tow rope connector comprises the tow rope connecting element [[attached to the bridging portion]] for attaching the tow rope directly thereto.

39. The method for improving aerial characteristics of a performance by a performer using a water sport implement and being towed behind a vessel while maintaining the stability of the vessel, the method comprising the steps of:

providing a vessel behind which the performer is to be towed, the vessel including a bow, a stern and an operator station between opposing sides;

fitting a first relatively rigid vertical support structure to a first one of the sides substantially abeam the operator's station, and fitting a second relatively rigid vertical support structure to a second one of the sides substantially abeam the operator's station, and then extending an elevated, generally horizontal bridge portion between the first and second vertically extending support structures, at a height substantially above the operator station;

attaching a tow rope connector to the horizontal bridging portion, the tow rope connector comprising at least one of a tow rope connecting element for attaching a tow rope thereto and a receiver for receiving the tow rope connecting element;

attaching a tow rope to the [[horizontally extending bridging portion]] tow rope connector; and operating the vessel in a body of water while towing the performer from the horizontally extending bridging portion.

* * * * *